United States Patent [19]

Hsieh

[11] Patent Number: 5,292,287
[45] Date of Patent: Mar. 8, 1994

[54] HUB ASSEMBLY FOR A REAR WHEEL AXLE OF A BICYCLE

[76] Inventor: Kinka Hsieh, No. 125, Shih Chien St., Feng Yuan City, Taichung Hsien, Taiwan

[21] Appl. No.: 893,550

[22] Filed: Jun. 4, 1992

[51] Int. Cl.⁵ .............................................. F16C 35/00
[52] U.S. Cl. ..................................... 474/151; 74/607; 474/903
[58] Field of Search ............... 474/151, 160, 164, 273, 474/903; 475/289, 297, 298; 74/594.1, 594.2, 607; 192/6 A

[56] References Cited

U.S. PATENT DOCUMENTS

| | | | |
|---|---|---|---|
| 3,726,156 | 4/1973 | Tijen et al. | 475/297 X |
| 4,069,725 | 1/1978 | Segawa | 475/297 |
| 4,472,163 | 9/1984 | Boitini | 474/160 |
| 5,024,121 | 6/1991 | Hsieh | 74/594.1 |

Primary Examiner—Ramon S. Britts
Assistant Examiner—Roger J. Schoeppel
Attorney, Agent, or Firm—Jones & Askew

[57] ABSTRACT

A hub rotatably engaged on a rear wheel axle of a multi-speed bicycle, a cone disposed on each end of the rear wheel axle, a bearing rotatably engaged between one end of the body and one of the cones, a barrel formed integral on the other end of the body and extended outward toward the other cone, another bearing rotatably engaged between the barrel and the other cone, whereby, the bearings are rotatably engaged on the ends of the rear wheel axle such that the rear wheel axle is stably supported in place.

1 Claim, 3 Drawing Sheets

HUB ASSEMBLY FOR A REAR WHEEL AXLE OF A BICYCLE

BACKGROUND OF THE INVENTION

1. Field of the Invention

The present invention relates to a hub assembly, and more particularly to a hub assembly for a rear wheel axle of a bicycle.

2. Description of the Prior Art

The closest prior art of which applicant is aware is his prior U.S. Pat. No. 5,024,121 to Hsieh, filed Oct. 15, 1990, entitled "HUB ASSEMBLY OF A BICYCLE AND THE LIKE". The hub assembly is provided to stably hold the rear wheel axle of the bicycle. The configuration thereof is complicated.

For multi-speed bicycles which are commercially available at present, a plurality of sprockets are engaged on one side of the hub assembly and extend outwards of the hub assembly. However, as shown in FIG. 4, one bearing 91 is disposed close to a first end of the rear wheel axle 90, and the other bearing 92 which is disposed in the end portion of the hub assembly is disposed close to the middle portion of the rear wheel axle, such that a distance is formed between the bearing 92 and the second end of the rear wheel axle, and such that a cantilever type support is formed, a large bending moment is thus formed. The rear wheel axle thus can not be stably supported, and the bearing 92 will suffer a large force or strength, such that the hub assembly will easily become loose.

The present invention has arisen to mitigate and/or obviate the afore-described disadvantages of the conventional hub assemblies for rear wheel axles.

SUMMARY OF THE INVENTION

The primary objective of the present invention is to provide a hub assembly for stably supporting the rear wheel axle of the bicycle.

In accordance with one aspect of the invention, there is provided a hub assembly for a rear wheel axle of a bicycle comprising a body rotatably engaged on the rear wheel axle, the rear wheel axle including a first cone threadedly engaged on a first end thereof and a second cone formed integral on a second end thereof, the body including a first end portion located close to the first cone of the rear wheel axle and a second end portion having a plurality of sprockets engaged thereon, a first bearing rotatably engaged between the first end portion of the body and the first cone, a barrel formed integral on the second end portion of the body and extended outward toward the second cone, a second bearing rotatably engaged between the barrel and the second cone, whereby, the first bearing and the second bearing are rotatably engaged on the first end and the second end of the rear wheel axle respectively such that the rear wheel axle is stably supported in place.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
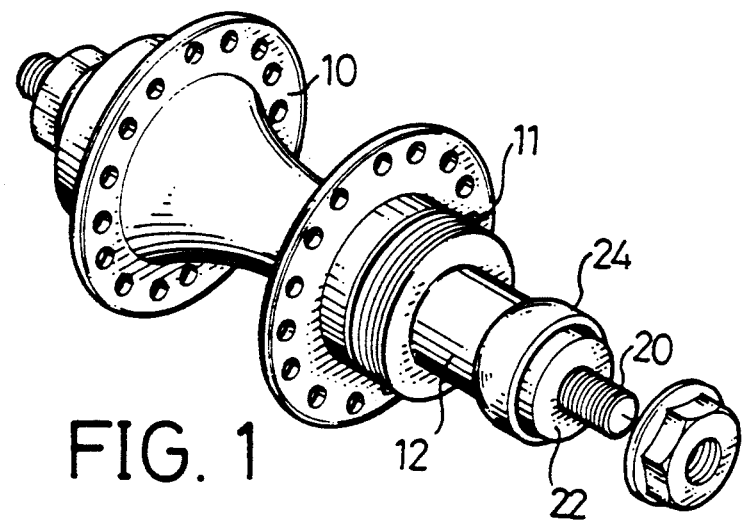
FIG. 1 is a perspective view of a hub assembly in accordance with the present invention.
Figure 3:
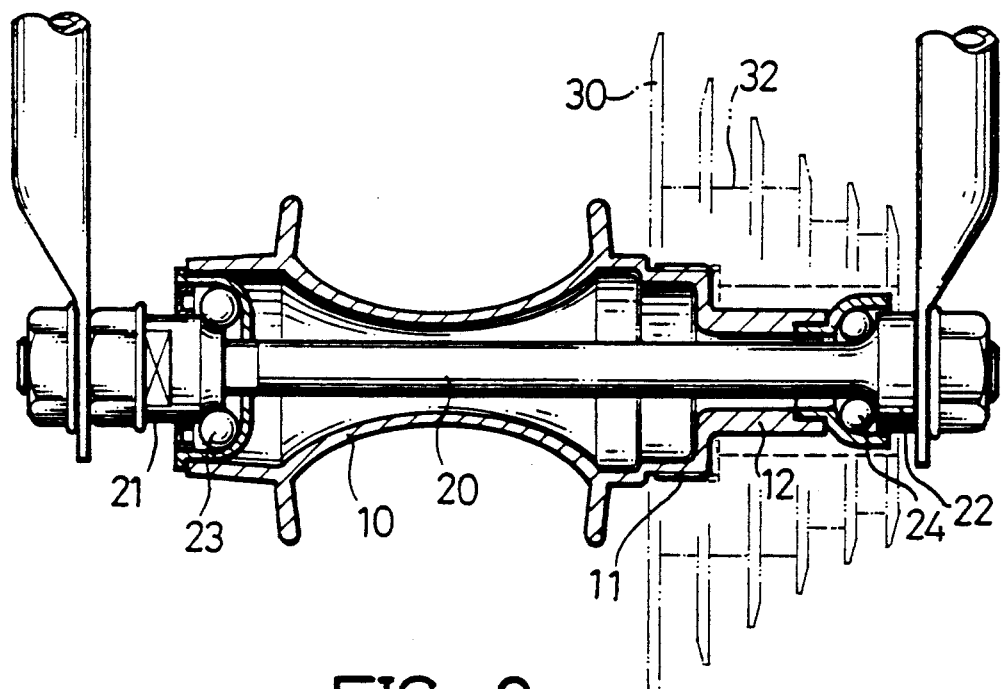
FIG. 3 is a cross sectional view of the hub assembly taken along lines 3-3 of FIG. 1.
Figure 2:
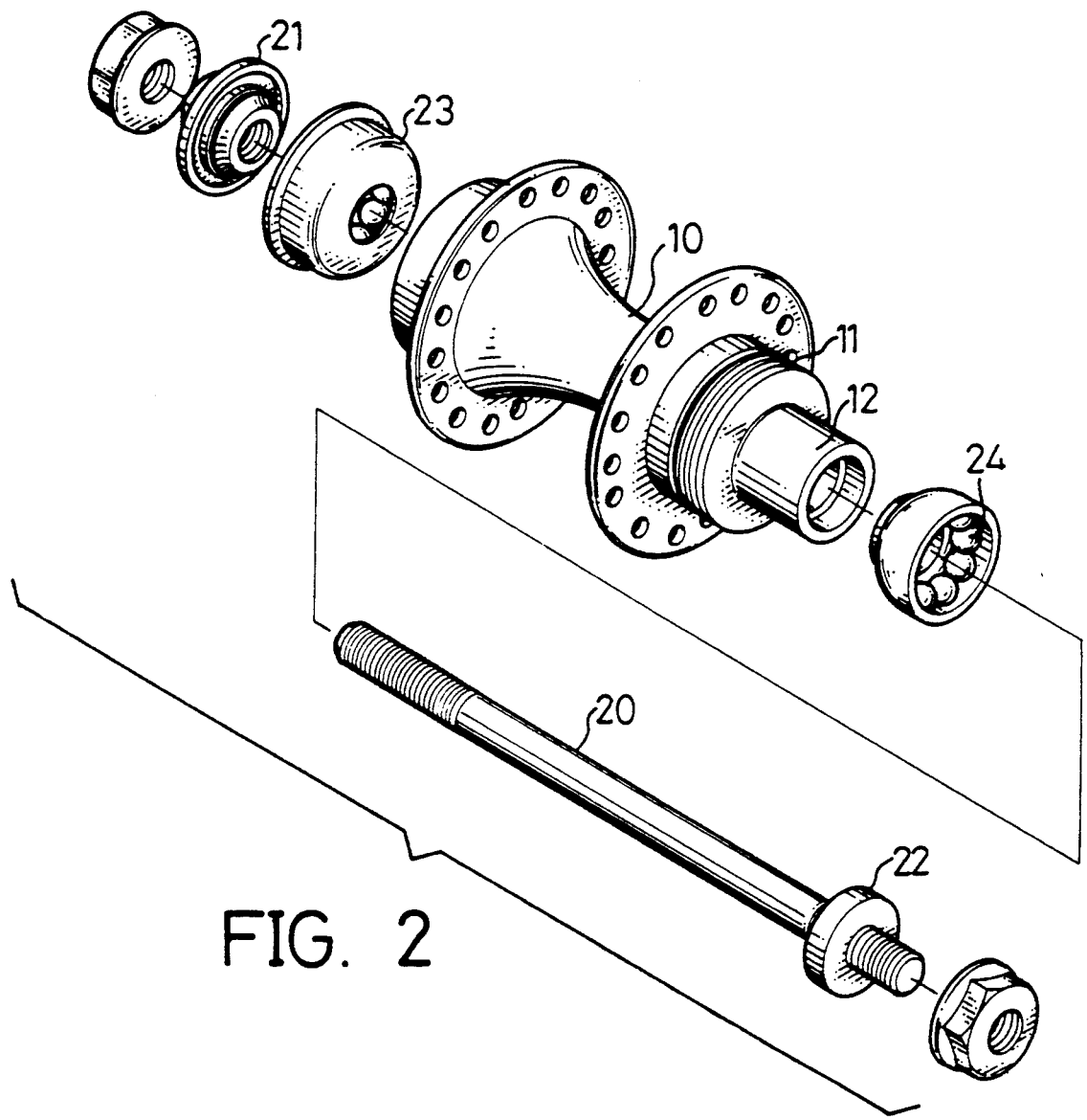
FIG. 2 is an exploded view of the hub assembly.
Figure 4:
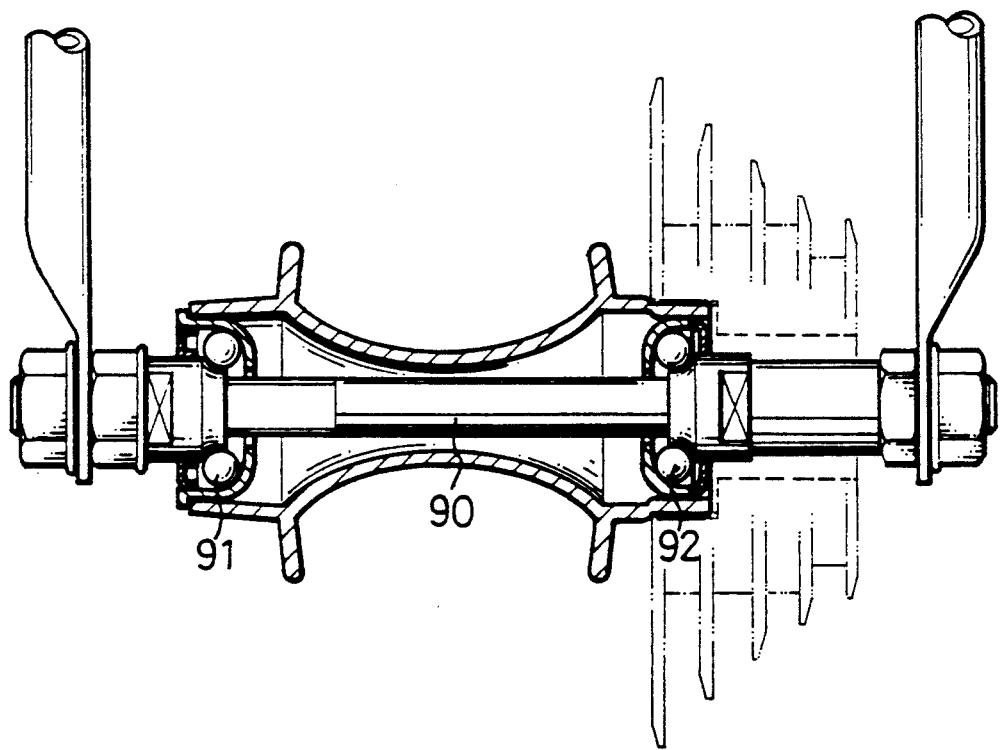
FIG. 4 is a cross sectional view illustrating a conventional hub assembly for the rear wheel axle.

Referring to FIGS. 1, 2 and 3, a hub assembly in accordance with the present invention is provided for supporting the rear wheel axle of a multi-speed bicycle and comprises generally a body 10 rotatably engaged on a rear wheel axle 20 having a first cone 21 threadedly engaged on a first end thereof and a second cone 22 formed integral on a second end thereof. A first bearing 23 is rotatably engaged between the first cone 21 and the first end of the body 10.

The body 10 includes a second end having an outer thread 11 formed thereon and located close to the middle portion of the rear wheel axle 20, and a barrel 12 formed integral on the second end thereof and extended outward toward the second cone 22. A second bearing 24 is rotatably engaged between the second cone 22 and the free end portion of the barrel 12. As shown in FIG. 3, a plurality of sprockets 30 of different sizes are unidirectionally and rotatably engaged on a sleeve 32 which has one end portion threadedly engaged on the outer thread 11 of the body 10. The sprockets 30 and the sleeve 32 are commercially available and will not be described in further details.

Accordingly, the hub assembly in accordance with the present invention includes a pair of bearings 23, 24 rotatably engaged on the end portions of the rear wheel axle 20 respectively, such that the rear wheel axle 20 can be stably supported in the hub assembly.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I CLAIM:

1. A hub assembly for a rear wheel axle of a bicycle comprising a body rotatably engaged on said rear wheel axle, said rear wheel axle including a first cone threadedly engaged on a first end thereof and a second cone formed integral on a second end thereof, said body including a first end portion located close to said first cone of said rear wheel axle and a second end portion having a plurality of sprockets engaged thereon, a first bearing rotatably engaged between said first end portion of said body and said first cone, a barrel formed integral on said second end portion of said body and extended outward toward said second cone, a second bearing rotatably engaged between said barrel and said second cone, whereby, said first bearing and said second bearing are rotatably engaged on said first end and said second end of said rear wheel axle respectively such that said rear wheel axle is stably supported in place.

* * * * *